(12) United States Patent
Wang et al.

(10) Patent No.: US 8,977,699 B2
(45) Date of Patent: Mar. 10, 2015

(54) METHOD AND DEVICE FOR SECURING EMAIL ADDRESS

(71) Applicant: Tencent Technology (Shenzhen) Company Limited, Shenzhen, Guangdong Province (CN)

(72) Inventors: Hui Wang, Shenzhen (CN); Wei Hu, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 0 days.

(21) Appl. No.: 13/903,876

(22) Filed: May 28, 2013

(65) Prior Publication Data

US 2013/0262608 A1 Oct. 3, 2013

Related U.S. Application Data

(63) Continuation of application No. PCT/CN2012/070980, filed on Feb. 9, 2012.

(30) Foreign Application Priority Data

Feb. 24, 2011 (CN) .......................... 2011 1 0045149

(51) Int. Cl.
*G06F 15/16* (2006.01)
*H04L 12/24* (2006.01)
*H04L 12/58* (2006.01)

(52) U.S. Cl.
CPC .............. *H04L 41/026* (2013.01); *H04L 12/58* (2013.01)

USPC ........................................................ 709/206

(58) Field of Classification Search
CPC ... H04L 12/58; H04L 12/589; H04L 12/5895; H04L 12/5855; H04L 41/026; H04L 61/307
USPC ......................................... 709/206, 245, 246
See application file for complete search history.

(56) References Cited

U.S. PATENT DOCUMENTS

| | | | |
|---|---|---|---|
| 8,468,348 B1 * | 6/2013 | Wasserman et al. .......... | 713/168 |
| 2008/0235336 A1 * | 9/2008 | Stern et al. .................... | 709/206 |
| 2011/0099239 A1 * | 4/2011 | Buchheit ....................... | 709/206 |

FOREIGN PATENT DOCUMENTS

| | | |
|---|---|---|
| CN | 1300016 A | 6/2001 |
| CN | 101052018 A | 10/2007 |
| CN | 101115026 A | 1/2008 |
| JP | 2002-73915 A | 3/2002 |
| JP | 2002-135334 A | 5/2002 |
| JP | 2008-276657 A | 11/2008 |
| WO | 2012113288 A1 | 8/2012 |

* cited by examiner

*Primary Examiner* — Brian J Gillis
*Assistant Examiner* — Michael A Keller
(74) *Attorney, Agent, or Firm* — Cheng-Ju Chiang

(57) ABSTRACT

A method for securing an email address includes: establishing a secure group constituted by associates in response to an establishment request from a sender, wherein the associates comprise the sender and a recipient; obtaining a secure-group address in response to a sending operation of an email; and replacing an email address of the sender of the email with the secure-group address and transmitting the email to an email address of the recipient of the email. A device for securing an email address is also provided.

14 Claims, 5 Drawing Sheets

US 8,977,699 B2

METHOD AND DEVICE FOR SECURING EMAIL ADDRESS

CROSS-REFERENCE TO RELATED APPLICATION

This application is a continuation application of International (PCT) Patent Application No. PCT/CN2012/070980, filed on Feb. 9, 2012, now pending and designating the United States, which also claims benefit of China Patent Application No. 201110045149.8, filed on Feb. 24, 2011. The entirety of the above-mentioned patent application is hereby incorporated by reference herein and made a part of this specification.

FIELD OF THE INVENTION

The present invention relates to the field of communication, and more particularly to method and device for securing an email address.

BACKGROUND OF THE INVENTION

Currently, for sending an email, a sender of an email may directly key the recipient's email address in a recipient's address bar or select the recipient's email address from the address book. After the email is successfully sent out, the email server first parses the recipient's email address, delivers the email to an object email server in the corresponding domain, and then transmits the email to the mailbox of the recipient.

In a case that the same email is to be sent to a plurality of recipients, the sender may directly key in or select the email addresses of the plurality of recipients, and alternatively, an email group may be established in advance, including therein the email addresses of the recipients of the email, and given a name of the email group name. Thus, by directly keying in or selecting the name of the email group, the sender can send the same email to all the associates in the email group.

However, the sender's email address information cannot be secured if the email is transferred to others by the recipient.

SUMMARY OF THE INVENTION

An objective of the present invention is to provide method and device for securing an email address so as to secure the email address information of the sender.

An embodiment of the disclosure provides a method for securing an email address, which includes steps of: establishing a secure group constituted by associates in response to an establishment request from a sender, wherein the associates comprise the sender and a recipient; obtaining a secure-group address in response to a sending operation of an email; and replacing an email address of the sender of the email with the secure-group address and transmitting the email to an email address of the recipient of the email.

Another embodiment of the disclosure provides a device for securing an email address, which includes an obtaining unit and a first transmission unit. The obtaining unit is configured to obtain a secure-group address in response to a sending operation of an email. The first transmission unit is configured to replace an email address of a sender of the email with the secure-group address and transmit the email to an email address of a recipient of the email.

Still another embodiment of the disclosure provides a method for securing an email address, which includes steps of: receiving an email; replacing an email address of a sender of the email with a secure-group address if an email address of a recipient of the email is determined to be a secure-group address, and the sender of the email is determined, according to the secure group address and a correspondence among the associates in a secure group to be one of the associates in the secure group; and transmitting the email to the associates in the secure group except the sender of the email.

Yet another embodiment of the disclosure provides a device for securing an email address, which includes a receiver unit, a replacement unit and a second transmission unit. The receiver unit is configured to receive an email. The replacement unit is configured to replace an email address of a sender of the email with a secure-group address if an email address of a recipient of the email is determined to be a secure-group address and the sender of the email is determined, according to a correspondence between the secure group address and associates in a secure group, to be one of the associates in the secure group. The second transmission unit is configured to transmit the email to the associates in the secure group except the sender of the email According to the technical solution provided by the present invention, the sender's email address information can be secured by replacing the sender's email address with the secure-group address.

BRIEF DESCRIPTION OF THE DRAWINGS

In order to describe the embodiments of the present invention more clearly, the accompanying drawings required for describing the embodiments are briefly introduced hereinafter. It is apparent that the accompanying drawings are only used for illustrating some of the embodiments of the present invention, and for those ordinarily skilled in the art, further drawings can be realized without additional inventive efforts.

DETAILED DESCRIPTION OF PREFERRED EMBODIMENTS

Hereinafter, combined with the accompanying drawings of the embodiments of the present invention, the technical solutions of the embodiments of the present invention are clearly and fully described. It is apparent that the embodiments are only some of the embodiments of the present invention other than all the embodiments. Based on the embodiments of the present invention, all the other embodiments derived therefrom without additional inventive efforts of an ordinarily skilled person in the art are included in the scope of the present invention.

The embodiments of the present invention will be described in further detail as follows with reference to the accompanying drawings.

Figure 1:
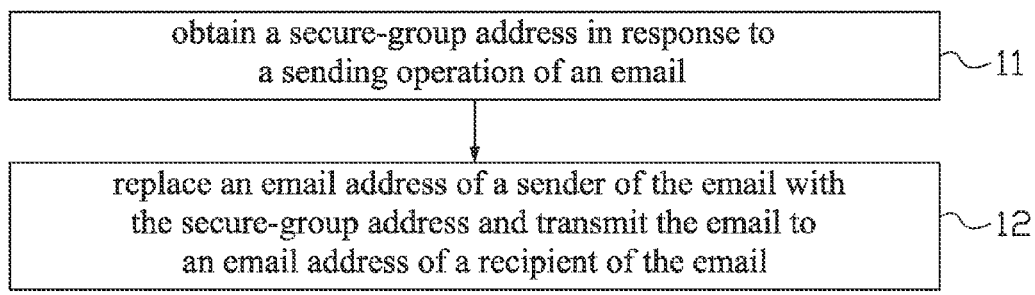
FIG. 1 is a flowchart schematically illustrating a method for securing an email address provided according to an embodiment of the present invention.

As shown in FIG. 1, an embodiment of the present invention provides a method for securing an email address, which includes:

Step 11: obtaining a secure-group address in response to a sending operation of an email.

Step 12: replacing an email address of a sender of the email with the secure-group address and transmitting the email to an email address of a recipient of the email.

The method for securing an email address in this embodiment of the present invention is mainly executed by an email server or an email client end.

According to the technical solution provided by the aforementioned present invention, the sender's email address information can be secured by replacing the sender's email address with the secure-group address.

Before the sending operation of the sender in Step 11, the method for securing an email address in this embodiment of the present invention may further include: establishing a secure group constituted by associates in response to an establishment request from the sender being as an initiator, wherein the associates include the sender and the recipient.

Exemplarily, when intending to send an email to one or more recipients and directly keying in or selecting one or more of recipients' email addresses, a sender, being as an initiator, establishes a secure group constituted by the sender and the recipient(s).

Optionally, the way of obtaining a secure-group address in Step 11 may include generating the secure-group address in a random manner. Preferably, the unique and irreversible secure-group address is randomly generated by using the short URL mapping algorithm.

The secure-group address includes a username and a domain-name address.

The username of the secure-group address includes that generated by performing an encryption algorithm on a username of the email address of the sender and/or username(s) of the email address(es) of the recipient(s).

The domain-name address of the secure-group address includes that of the email address of the sender.

Thus, the secure-group address complies with the email address standard so that the email addressed to the secure-group address can be correctly transmitted to a specified email server for further processing, and a variety of email client ends and Webmail (Web mail systems) can receive the email with the secure-group address.

To distinguish the secure-group address from common email addresses, the secure-group address can be made to comply with certain rules. For example, the username of the secure-group address may further include a secure-group label, which apparently indicates that the address is a secure-group address.

After generating the secure-group address in a random manner, the method for securing an email address according to an embodiment of the present invention may further include: storing a correspondence between the secure-group address and the associates in the secure group.

For example, the correspondence between the secure-group address and the associates in the secure group can be stored through a mapping table.

Exemplarily, the sender of an email has an email address admin@qq.com. The recipients of the email have respective email addresses A@qq.com, B@163.com, C@sohu.com and D@qq.com.

According to the addresses admin@qq.com, A@qq.com, B@163.com, C@sohu.com and D@qq.com, a secure-group address of DEMO@qq.com is generated; and the secure-group address, after being added with a secure-group label, becomes SG_DEMO@qq.com.

The mapping table stores therein the correspondence between the secure-group address and the associates in the secure group:

| SG_DEMO@qq.com | { A@qq.com<br>B@163.com<br>C@sohu.com<br>D@qq.com<br>admin@qq.com |
|---|---|

Optionally, replacing an email address of a sender of the email with the secure-group address and transmitting the email to email address(es) of recipient(s) of the email in Step 12 may include: generating a specified number of one-to-one email(s) according to the number of the recipient(s) and transmitting the email to the email address(es) of the recipient(s). The above-described one-to-one email is an email where a secure-group address is shown as the email address of the sender and in addition, no recipient's email address information is disclosed.

In other words, if the number of recipients of the email is more than one, a one-to-one email is transmitted to the email address of each recipient with the email address of the sender of the email replaced with the secure-group address.

By replacing the email address of the sender of the email with the secure-group address, the recipient manages to secure the email address information of the sender so as to prevent the email address information of the sender from disclosure when the recipient forwards the email. In addition, any recipient in the secure group may not know any other recipient of the same email as a one-to-one email is sent.

Optionally, the method for securing an email address according to an embodiment of the present invention may further include: describing the sender's identity information in the body of the email.

The identity information of the sender may include any specified information associated with the sender, e.g. the sender's name, except the sender's email address.

Since the email address information of the sender is secured, the recipient may describe other identify information of the sender in the text of the email.

Optionally, based on the secure group established by an initiator, the method for securing an email address according to an embodiment of the present invention may further include: labeling the initiator in the correspondence between the secure-group address and the associates in the secure group.

Optionally, the method for securing an email address according to an embodiment of the present invention may further include: setting whether a reply to the email is permissible or not in response to a reply-setting request from the initiator.

The initiator can request for setting whether a reply to an email is permissible or not so that some emails are only used for notification without any reply, but some emails are permitted to reply thereto.

Optionally, the method for securing an email address according to an embodiment of the present invention may further include: setting an effective time of the correspondence between the secure-group address and the associates in the secured group in response to a setting-effective-time request from the initiator.

If a reply to the email is permissible, the initiator can request to set the effective time of the correspondence between the secure-group address and the associates in the secured group; and the correspondence between the secure-group address and the associates in the secured group will be cancelled after the effective time expired.

Optionally, the method for securing an email address according to an embodiment of the present invention may further include: changing the attribute of the secured group in response to a changing request from the initiator.

The step of changing the attribute of the secured group may further include closing the secured group, and correspondingly cancelling the correspondence between the secure-group address and the associates in the secure group.

Thus, the initiator can request for changing the attribute of the secured group. For example, the initiator can request for closing the secure group at any time.

Optionally, the method for securing an email address according to an embodiment of the present invention may further include: checking a situation of the associates in the secured group replying the email in response to a checking request from the initiator.

Thus, if a reply to the email is permissible, the initiator has the authority to check the situation of the associates in the secured group replying the email, for example, the sequence of the associates in the secure group replying the email. By checking the situation of the associates in the secured group replying the email, the initiator can determine whether there existing an associate impersonating other associate in the text of the replied email.

Figure 2:
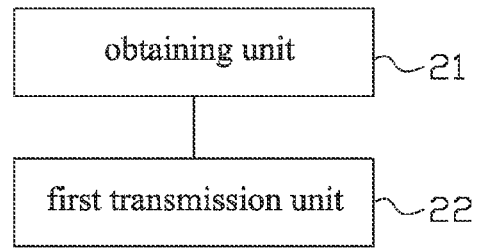
FIG. 2 is a first constructional diagram of a device for securing an email address provided according to an embodiment of the present invention.

Corresponding to the method for securing an email address in the aforementioned embodiment, an embodiment of the present invention provides a device for securing an email address as shown in FIG. 2, which includes: an obtaining unit 21 configured to obtain a secure-group address in response to a sending operation of an email; and a first transmission unit 22 configured to replace an email address of a sender of the email with the secure-group address and transmit the email to an email address of a recipient of the email.

The device for securing an email address in this embodiment of the present invention may be disposed individually or integrated with an email server.

According to the technical solution provided by the aforementioned present invention, the sender's email address information can be secured by replacing the sender's email address with the secure-group address.

Optionally, the first transmission unit 22 is further configured to generate a specified number of one-to-one email(s) according to the number of the recipient(s) and transmit the email to the email address(es) of the recipient(s).

Thus, by generating the one-to-one email, no recipient's information is disclosed.

Figure 3:
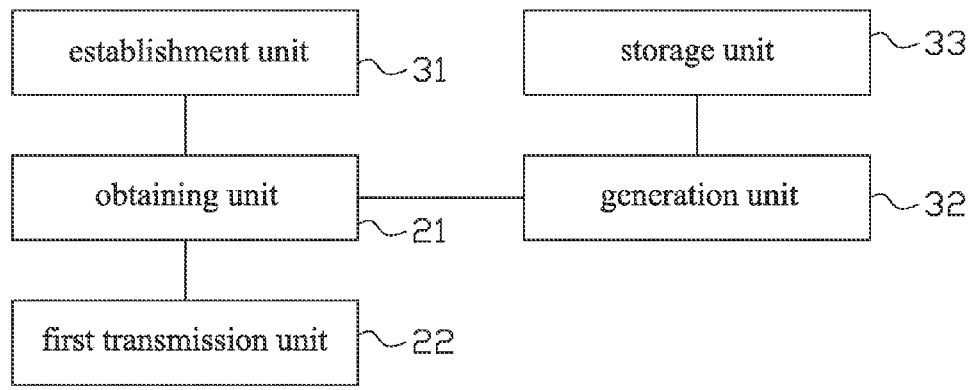
FIG. 3 is a second constructional diagram of a device for securing an email address provided according to an embodiment of the present invention.

As shown in FIG. 3, the device for securing an email address according to an embodiment of the present invention may further include: an establishment unit 31 configured to establish a secure group constituted by associates in response to an establishment request from the sender being as an initiator, wherein the associates include the sender and the recipient.

Exemplarily, when intending to send an email to one or more recipients and directly keying in or selecting one or more of recipients' email addresses, a sender, being as an initiator, establishes a secure group constituted by the sender and the recipient(s).

The device for securing an email address according to an embodiment of the present invention may further include: a generation unit 32 configured to generate the secure-group address in a random manner.

Preferably, the unique and irreversible secure-group address is randomly generated by using the short URL mapping algorithm.

The secure-group address includes a username and a domain-name address.

The username of the secure-group address includes that generated by performing an encryption algorithm on a username of the email address of the sender and/or username(s) of the email address(es) of the recipient(s).

The domain-name address of the secure-group address includes that of the email address of the sender.

Thus, the secure-group address complies with the email address standard so that the email addressed to the secure-group address can be correctly transmitted to a specified email server for further processing, and a variety of email client ends and Webmail can receive the email with the secure-group address.

To distinguish the secure-group address from common email addresses, the secure-group address can be made to comply with certain rules. For example, the username of the secure-group address may further include a secure-group label, which apparently indicates that the address is a secure-group address.

Optionally, the device for securing an email address according to an embodiment of the present invention may further include: a storage unit 33 configured to store a correspondence between the secure group address and the associates in the secure group.

For example, the correspondence between the secure-group address and the associates in the secure group can be stored through a mapping table.

Optionally, the device for securing an email address according to an embodiment of the present invention may further include: a labeling unit configured to label the initiator in the correspondence between the secure-group address and the associates in the secure group.

The device for securing an email address according to an embodiment of the present invention may further include: a first setting unit configured to set whether a reply to the email is permissible or not in response to a reply-setting request from the initiator.

Optionally, the device for securing an email address according to an embodiment of the present invention may further include: a second setting unit configured to set an effective time of the correspondence between the secure-group address and the associates in the secured group in response to a setting-effective-time request from the initiator.

Optionally, the device for securing an email address according to an embodiment of the present invention may further include: a changing unit configured to change the attribute of the secured group in response to a changing request from the initiator. For example, the initiator can request for closing the secure group at any time.

Optionally, the device for securing an email address according to an embodiment of the present invention may further include: a checking unit configured to check a situation of the associates in the secured group replying the email in response to a checking request from the initiator.

The device and the components therein for securing an email address according to the embodiment of the present invention can be understood by referring the corresponding descriptions in the method for securing an email address in the aforementioned embodiment; and no unnecessary detail is given here.

Figure 4:
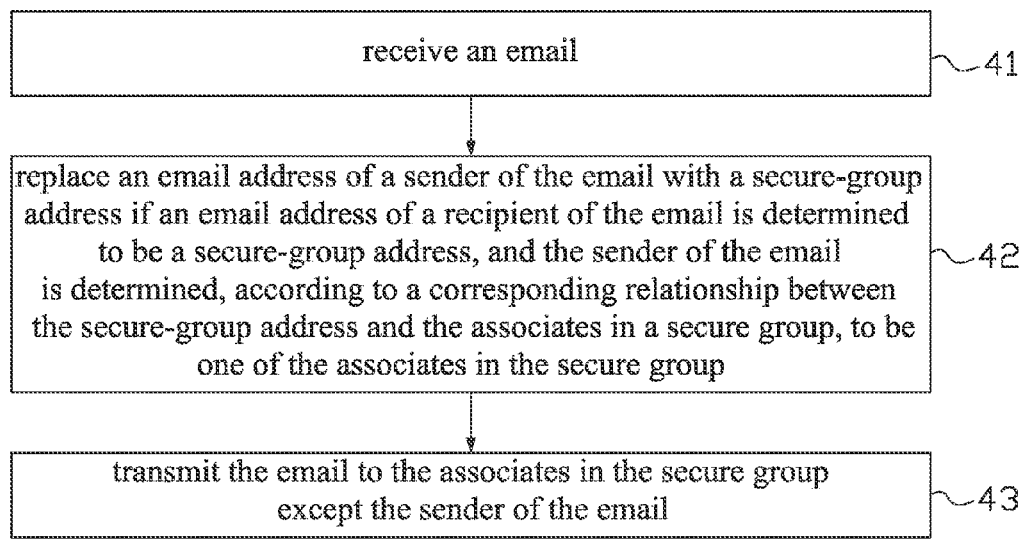
FIG. 4 is a flowchart schematically illustrating a method for securing an email address provided according to another embodiment of the present invention.

As shown in FIG. 4, an embodiment of the present invention provides a method for securing an email address, which includes:

Step 41: receiving an email.

Step 42: replacing an email address of a sender of the email with a secure-group address if an email address of a recipient of the email is determined as a secure-group address and the sender of the email is determined, according to a correspondence between the secure-group address and associates in the secure group, as one of the associates in the secure group; and Step 43: transmitting the email to all the associates in the secure group except the sender.

The method for securing an email address in this embodiment of the present invention is mainly executed by an email server or an email client end.

According to the technical solution provided by the present invention, the sender's email address information can be secured by replacing the sender's (the replier's) email address of a reply email with the secure-group address, if the received email is a reply email.

Optionally, the method for securing an email address according to an embodiment of the present invention may further include: determining whether the email address of the recipient of the email is a secure-group address according to a secure-group label.

To distinguish the secure-group address from common email addresses, the secure-group address can be made to comply with certain rules. For example, the username of the secure-group address may further include the secure-group label, which apparently indicates that the address is a secure-group address when the email is being received.

Optionally, the method for securing an email address according to an embodiment of the present invention may further include: determining whether there exists a mapping table indicating a correspondence between the secure-group address and the associates in the secure group.

There exists an effect time of the mapping table for indicating the correspondence between the secure-group address and the associates in the secure group; and the correspondence between the secure-group address and the associates in the secured group will be cancelled by a mail server after the effective time expired.

If there exists the mapping table for indicating the correspondence between the secure-group address and the associates in the secure group and the mapping table is still effective, whether the sender of the email is an associate in the secure group or not can be determined according to the correspondence between the secure-group address and the associates in the secure group.

Optionally, the method for securing an email address according to an embodiment of the present invention may further include describing the sender's identity information in the body of the email.

The identity information of the sender may include any specified information associated with the sender, e.g. the sender's name, except the sender's email address.

Because the email address of the replier is replaced with the secure-group address, there might happen that a replier impersonates other associates to reply the email when describing the sender's identity information in the body of the email. Thus, by checking the original reply email (that is, the email that the sender's email address has not been replaced with the secure-group address) received at the email server, the initiator can realize whether there is any replier impersonating other associates.

Specifically, the way of transmitting the email to all the associates in the secure group except the sender in Step 43 may include transmitting one-to-one emails to all the associates in the secure group except the sender.

Figure 5:
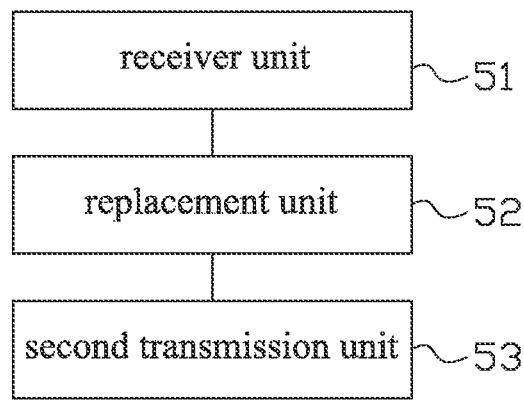
FIG. 5 is a first constructional diagram of a device for securing an email address provided according to another embodiment of the present invention.

Corresponding to the method for securing an email address in the aforementioned embodiments, an embodiment of the present invention provides a device for securing an email address as shown in FIG. 5, which includes: a receiver unit 51 configured to receive an email; a replacement unit 52 configured to replace an email address of a sender of the email with a secure-group address if an email address of a recipient of the email is determined as a secure-group address and the sender of the email is determined, according to a correspondence between the secure-group address and associates in the secure group, as one of the associates in the secure group; and a second transmission unit 53 configured to transmit the email to the associates in the secure group except the sender.

The device for securing an email address in this embodiment of the present invention may be disposed separately or integrally with an email server.

According to the technical solution provided by the aforementioned embodiments, the sender's email address information can be secured by replacing the sender's email address with the secure-group address.

Figure 6:
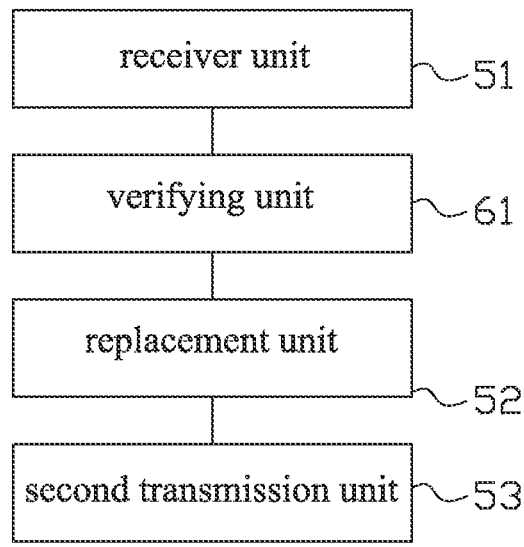
FIG. 6 is a second constructional diagram of a device for securing an email address provided according to another embodiment of the present invention.

As shown in FIG. 6, the device for securing an email address according to an embodiment of the present invention may further include a verifying unit 61 configured to verify whether the email address of the recipient of the email is the secure-group address or not according to a secure group label.

The device and the components included therein for securing an email address according to the embodiment of the present invention can be understood by referring to the corresponding descriptions in the method for securing an email address in the aforementioned embodiment; and no redundant detail is to be given herein.

Figure 7:
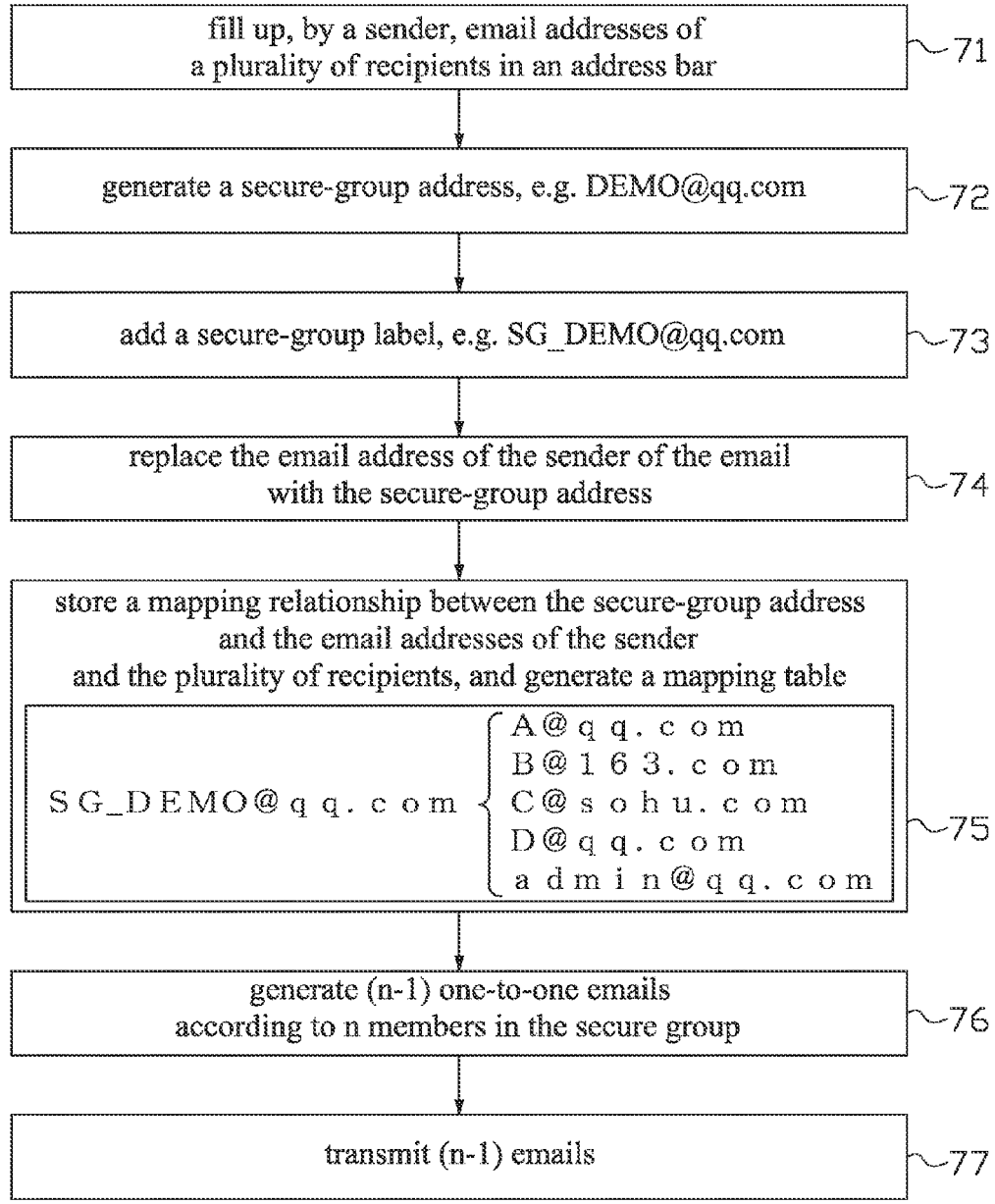
FIG. 7 is a practical example of a method for securing an email address provided according to an embodiment of the present invention.

FIG. 7 is a practical example of a method for securing an email address provided according to an embodiment of the present invention.

Exemplarily, the sender of an email has an email address admin@qq.com. The recipients of the email have email addresses A@qq.com, B@163.com, C@sohu.com and D@qq.com. The method for securing an email address according to the present invention will be described hereinafter.

In Step 71, the sender keys the email addresses of the recipients in an address bar, and the method then moves to Step 72 if the sender selects to send the email in a secured way.

After keying the email addresses of the recipients in the address bar, the sender being as an initiator establishes a secure group, which is constituted by the sender and the recipients; wherein each member in the secure group corresponds to an email address.

In Step 72, the email server, to which the sender's email address belongs, automatically generates an irreversible and unique mapping secure-group address, e.g. DEMO@qq.com.

Exemplarily, the mail server, to which the sender's email address admin@qq.com belongs, is the server QQ.com.

Exemplarily, a process of generating the secure-group address by using the "short URL mapping algorithm" is provided as follows, but the implementation is not limited to this specific technology:

(1) generating, from the email address strings of the members in the secure group, a 32-bit signature string by the Message-Digest Algorithm 5 (MD5); wherein the 32-bit signature string is divided into four sections and each section has 8 bytes;

(2) performing a cyclic operation on the four sections, taking each 8 bytes as one hexadecimal string and performing the AND operation on the hexadecimal string with 0x3fffffff (30 bits 1); wherein, the part exceeding 30 bits is ignored;

(3) dividing the 30 bits into six sections each including 5 bits and sequentially obtaining six strings by referring the number corresponding to the 5 bits as an index of an alphabet;

(4) obtaining four 6-bit strings from the total md5 string, selecting any one of the four 6-bit strings, and generating the secure-group address by adding the domain-name address of the sender with the selected four 6-bit strings.

In Step 73, the email server adds a secure-group label (e.g., SG) to the aforementioned secure-group address; wherein the secure-group address added with the secure-group label is SG_DEMO@gq.com.

In Step 74, the email server replaces the sender's email address with the secure-group address.

In, Step 75, the email server stores and generates a mapping table indicating a mapping relationship between the secure-group address and the email addresses of the sender as well as the recipients of the email.

For example, according to the mapping relationship between SG_DEMO@gq.com and admin@qq.com as well as the recipients' email addresses, a mapping table is generated as follows:

| SG_DEMO@qq.com | { | A@qq.com<br>B@163.com<br>C@sohu.com<br>D@qq.com<br>admin@qq.com |
|---|---|---|

Optionally, the effective time of the mapping table is set; and the mail server cancels the mapping table after the effective time expired.

In Step 76, the email server generates (n−1) one-to-one emails (except the sender itself) when the email addresses of n members are included in the secure group. In the above example, n is equal to 5.

In Step 77, the email server transmits the (n−1) emails. In the above example, n is equal to 5.

Optionally, the admin@qq.com is labeled as an initiator when the mapping table is established. The initiator may change the attribute of the secure group within an effective time of the mapping table; for example, the initiator may close the secure group at any time within the effective time.

The initiator may set additional conditions, for example the condition about whether a reply to the email is permissible as some emails are only used for notification without requiring any reply, but some emails are permitted to reply thereto within the effective time of the mapping table.

The initiator has the authority to check the sequence of the members in the secure group replying the email so as to determine whether there exists any associate impersonating other members when replying the email.

According to the technical solutions provided in the aforementioned embodiments, the sender's email address information can be secured by replacing the sender's email address with the secure-group address.

With reference to FIG. 7, the secure group is constituted of admin@qq.com, A@qq.com, B@163.com, C@sohu.com and D@qq.com. The email server receives a reply email with an email address B@163.com after the sender with an email address admin@qq.com sending the email.

Figure 8:
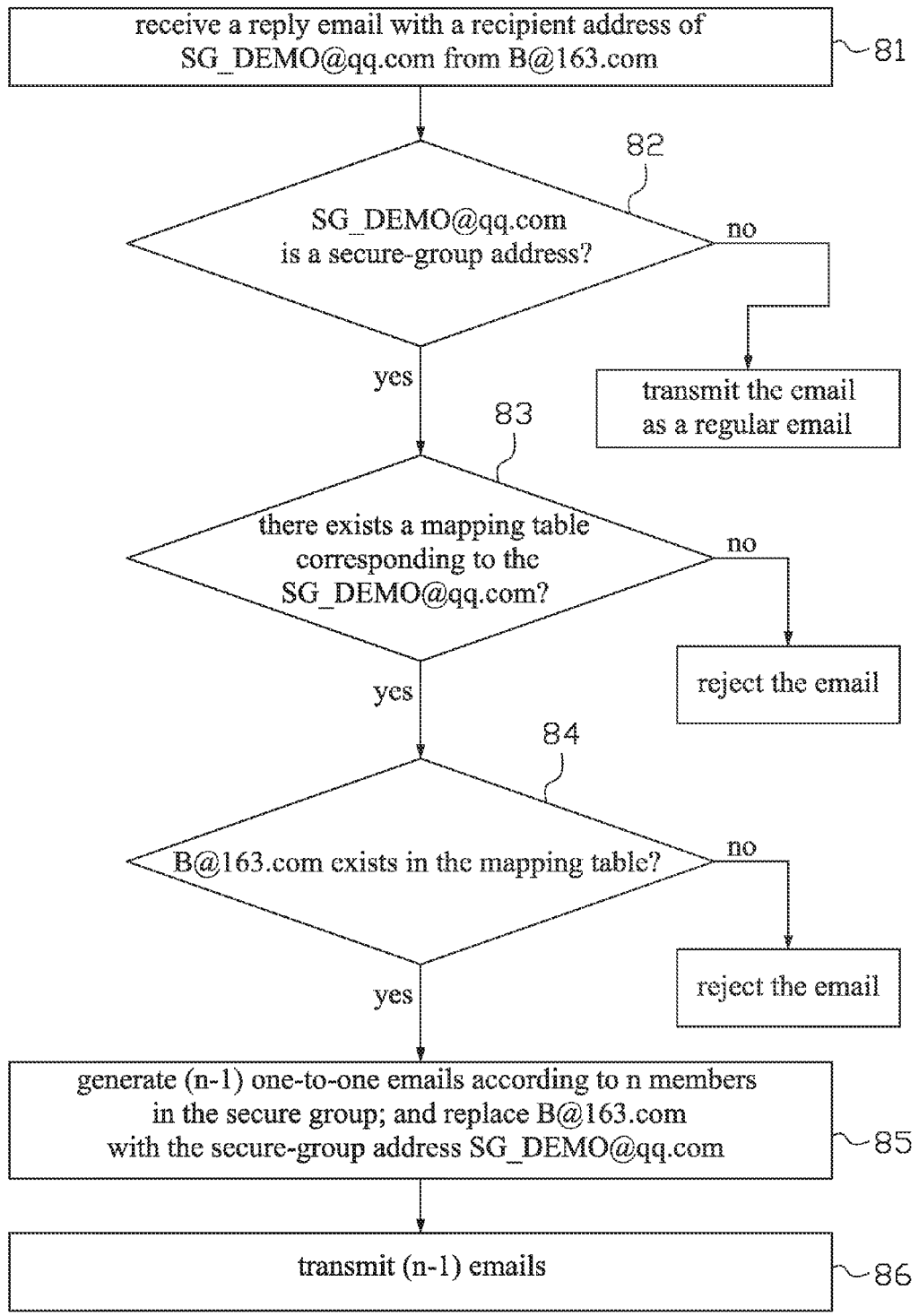
FIG. 8 is a practical example of a method for securing an email address provided according to an embodiment of the present invention.

FIG. 8 is a practical example of a method for securing an email address provided according to an embodiment of the present invention, which will be described hereinafter.

In Step 81, the email server receives a reply email with a sender email address of SG_DEMO@qq.com from B@163.com; wherein the sender (or the replier) of the reply email has an email address B@163.com, and the recipient of the reply email has an email address SG_DEMO @ qq.com. In this example, the email server is the server QQ.com.

In Step 82, the email server determines whether the recipient's email address SG_DEMO@gq.com is a secure-group address or not according to a secure-group label. The method moves to Step 83 if yes; otherwise, the email is treated as a common email.

In Step 83, the mail server looks up and determines whether there exists the mapping table corresponding to the secure-group address SG_DEMO@gq.com. The method moves to Step 84 if yes; otherwise, the email is rejected.

For example, the mapping table is:

| SG_DEMO@qq.com | { | A@qq.com<br>B@163.com<br>C@sohu.com<br>D@qq.com<br>admin@qq.com |
|---|---|---|

In Step 84, the email server looks up and determines whether the replier's email address B@163.com is in the mapping table. The method moves to Step 85 if yes; otherwise, the email is rejected.

For example, the mapping table is:

| SG_DEMO@qq.com | { | A@qq.com<br>B@163.com<br>C@sohu.com<br>D@qq.com<br>admin@qq.com |
|---|---|---|

Therefore, other email addresses A@qq.com, C@sohu.com, D@qq.com and admin@qq.com are obtained according to the mapping table.

In Step 85, the email server generates (n−1) one-to-one emails (except the replier himself) as n email addresses are included in the mapping table, and replaces the replier's email address B@163.com with the secure-group address SG_DEMO@qq.com; wherein the reply email is sent to all the email addresses in the mapping table except the replier. In this example, n is equal to 4.

In Step 86, the email server transmits the (n−1) emails. In this example, n is equal to 4.

In the aforementioned Step 83, the email server is not able to find the mapping table corresponding to the secure-group address if the effective time of the mapping table expired, and accordingly the replier will receive a rejected email which prompts the contents, "the recipient address does not exist".

Moreover, in the aforementioned Step 84, the members in the secure group are able to reply the email, but the members not in the secure group cannot reply the email to the members in the secure group through the secure-group address. If a member not in the secure group intends to reply the email, this member will receive a rejected mail which prompts that the contents, "the recipient address does not exist".

According to the technical solutions provided in the aforementioned embodiments, the sender's email address information can be secured by replacing the sender's email address with the secure-group address, if the received email is a reply email.

To those skilled in the art, it is understood that the system, device and method disclosed above may be implemented by alternative means based on the concepts of the embodiments described above. The devices used in the above embodiments are for illustration only. For example, the units are divided by way of functions and logic, but the units can be divided by other ways such as combining or integrating a plurality of units or components, or some features may be ignored or not executed. Moreover, the coupling, direct coupling or communication connection illustrated in drawings or described in descriptions of the embodiments can be realized through some interfaces; and the indirect coupling or communication connection between devices and units can be realized by electrical or mechanical means.

The individual units may be or may not be separated physically to each other. Each component in the form of illustrated unit may be or may not be a physical unit. The units described in the embodiments can be located in the same place or distributed to a plurality of network units. The object of the present embodiments can be realized by the whole or a portion of the units based on actual requirement.

In addition, the functional units in the embodiments of the present invention can be integrated into a processing unit, and exist physically and individually, or partially integrated into one unit. The integrated unit described above can be realized in the form of hardware or in the form of a software function unit.

The integrated unit, if being realized by form of software functional unit and being able to be sold or used independently, may be stored in a computer readable storage medium. Based on such understanding, the essence of the technical solution of the present invention, the contributing part to the prior art, or the whole part of the technical solution can be realized in form of a software product. The computer software product is stored in a storage medium and includes a plurality of instructions for configuring a computer equipment (e.g., a personal computer, server, or network equipment, etc.) to perform all or part of the steps in the method embodiments of the present invention. The storage medium includes: an USB disk, removable hard disk, read-only memory (ROM), random access memory (RAM), hard disk or CD-ROM or any various medias that can store program code.

What is described above is preferred embodiments according to the present invention only rather than used for limiting the present invention. On the contrary, it is intended to cover various modifications and similar arrangements included within the spirit and scope of the appended claims which are to be accorded with the broadest interpretation so as to encompass all such modifications and similar structures.

According to the method and device for securing an email address of present invention, the sender's email address information can be secured by replacing the sender's email address with the secure-group address.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for securing an email address, comprising:
establishing a secure group constituted by associates in response to an establishment request from a sender, wherein the associates comprise the sender and a recipient, generating a secure-group address of the secure group in a random manner, wherein the secure-group address comprises a username and a domain-name address, the username of the secure-group address is generated by performing an encryption algorithm on at least one of a username of the email address of the sender and a username of the email address of the recipient, and the domain-name address of the secure-group address is same as the domain-name address of the sender;
obtaining the secure-group address in response to a sending operation of an email, according to the sender and the recipient of the email; and
replacing an email address of the sender of the email with the secure-group address and transmitting the email to an email address of the recipient of the email.

2. The method according to claim 1, wherein the email is sent to a plurality of recipients, and the email is transmitted to email addresses of the plurality of recipients by:
generating a specified number of one-to-one emails according to the number of the recipients, and transmitting the email to the email addresses of the recipients.

3. The method according to claim 1, wherein the username of the secure-group address further comprises a secure group label.

4. The method according to claim 1, further comprising:
storing a correspondence between the secure-group address and the associates in the secure group in a mapping table.

5. The method according to claim 4, further comprising:
setting an effective time of the mapping table; and
cancelling the mapping table after the effective time expired.

6. A device for securing an email address, comprising:
one or more processors;
a memory; and
one or more program units stored in the memory and to be executed by the one or more processors, wherein the one or more program units comprise:
an establishment unit configured to establish a secure group constituted by associates in response to an establishment request from a sender, wherein the associates comprise the sender and a recipient;
a generation unit configured to generate a secure-group address of the secure group in a random manner, wherein the secure-group address comprises a username and a domain-name address, the username of the secure-group address is generated by performing an encryption algorithm on at least one of a username of the email address of the sender and a username of the email address of the recipient, and the domain-name address of the secure-group address is same as the domain-name address of the sender;
a receiver unit configured to receive an email;
an obtaining unit configured to obtain the secure-group address in response to a sending operation of an email, according to the sender and the recipient of the email; and
a first transmission unit configured to replace an email address of the sender of the email with the secure-group address and transmit the email to an email address of the recipient of the email.

7. The device according to claim 6, wherein the first transmission unit is configured to generate a specified number of one-to-one emails according to the number of the recipient or recipients and transmit the email to the email address of each the recipient.

8. The device according to claim 6,
wherein the secure-group address is generated in a random manner by the generation unit.

9. The device according to claim 6, further comprising:
a storage unit configured to store a correspondence between the secure group address and the associates in the secure group in a mapping table.

10. The device according to claim 9, further comprising:
a setting unit configured to set an effective time of the mapping table.

11. A method for securing an email address, comprising:
receiving a reply email from a recipient for replying an email sent from a sender;
determining whether an email address of the sender is a secure-group address of a secure group, wherein the secure group is constituted by associates in response to an establishment request from the sender, the associates comprise the sender and the recipient, the secure-group address comprises a username and a domain-name address, the username of the secure-group address is generated by performing an encryption algorithm on at least one of a username of the email address of the sender and a username of the email address of the recipient, and the domain-name address of the secure-group address is same as the domain-name address of the sender;
determining whether the recipient is one of the associates in the secure group;
replacing an email address of the recipient with the secure-group address if the email address of the sender of the reply email is determined to be the secure-group address, and the recipient is determined to be one of the associates in the secure group; and
transmitting the reply email to the associates in the secure group except the recipient.

12. The method according to claim 11, wherein whether the email address of the sender is the secure-group address is determined according to a secure group label in the username of the secure-group address.

13. A device for securing an email address, comprising:
one or more processors;
a memory; and
one or more program units stored in the memory and to be executed by the one or more processors, wherein the one or more program units comprise:
a receiver unit configured to receive a reply email from a recipient for replying an email sent from a sender;
a replacement unit configured to:
determine whether an email address of the sender is a secure-group address of a secure group, wherein the secure group is constituted by associates in response to an establishment request from the sender, the associates comprise the sender and the recipient, the secure-group address comprises a username and a domain-name address, the username of the secure-group address is generated by performing an encryption algorithm on at least one of a username of the email address of the sender and a username of the email address of the recipient, and the domain-name address of the secure-group address is same as the domain-name address of the sender;
determine whether the recipient is one of the associates in the secure group;
replace an email address of the recipient with the secure-group address if the email address of the sender of the reply email is determined to be the secure-group address, and the recipient is determined to be one of the associates in the secure group; and
a second transmission unit configured to transmit the reply email to the associates in the secure group except the recipient.

14. The device according to claim 13,
wherein whether the email address of the sender is the secure-group address is determined according to a secure group label in the username of the secure-group address.

* * * * *